CROSS REFERENCE

Feb. 6, 1962 A. J. PRESTIGIACOMO 3,020,344

APPARATUS FOR DERIVING PITCH INFORMATION FROM A SPEECH WAVE

Filed Dec. 27, 1960 3 Sheets-Sheet 1

INVENTOR
A. J. PRESTIGIACOMO
BY
G. E. Hirsch Jr.
ATTORNEY

APPARATUS FOR DERIVING PITCH INFORMATION FROM A SPEECH WAVE

Filed Dec. 27, 1960 3 Sheets-Sheet 2

INVENTOR
A. J. PRESTIGIACOMO
BY
G. E. Hirsch Jr.
ATTORNEY

APPARATUS FOR DERIVING PITCH INFORMATION FROM A SPEECH WAVE

Filed Dec. 27, 1960 3 Sheets-Sheet 3

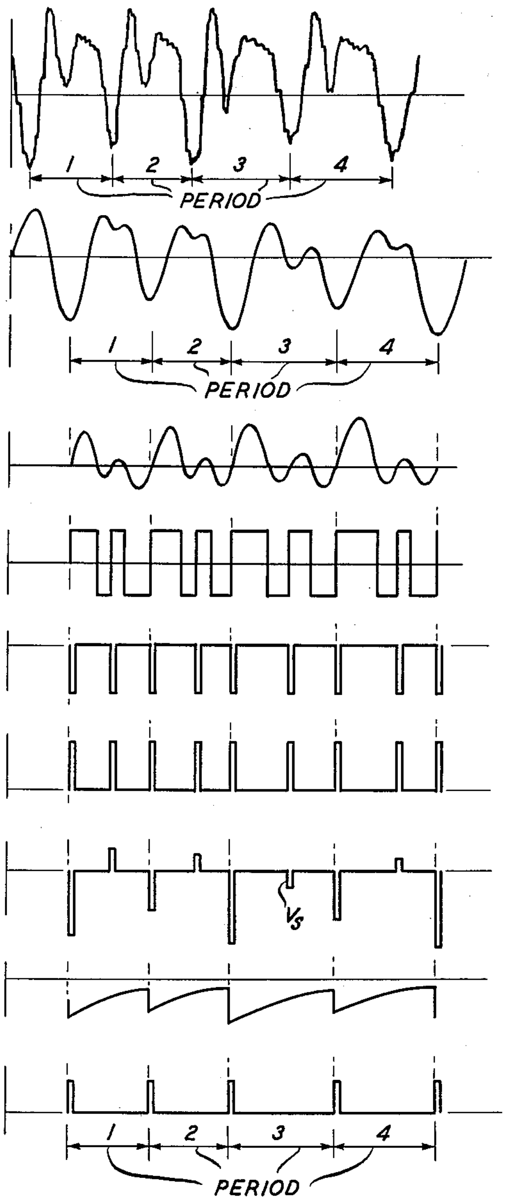

FIG. 3A INCOMING SPEECH WAVE, FIG. 3B ASYMMETRICAL WAVE, FIG. 3C DERIVATIVE WAVE, FIG. 3D INFINITELY CLIPPED DERIVATIVE WAVE, FIG. 3E NEGATIVE SAMPLING PULSES, FIG. 3F POSITIVE SAMPLING PULSES, FIG. 3G SAMPLES OF NEGATIVE-GOING PEAKS OF ASYMMETRICAL WAVES, FIG. 3H SAWTOOTH WAVE, FIG. 3J PITCH PERIOD SIGNAL

INVENTOR
A. J. PRESTIGIACOMO
BY G. E. Hirsch Jr.
ATTORNEY

United States Patent Office 3,020,344
Patented Feb. 6, 1962

3,020,344

APPARATUS FOR DERIVING PITCH INFORMATION FROM A SPEECH WAVE

Anthony J. Prestigiacomo, North Plainfield, N.J., assignor to Bell Telephone Laboratories, Incorporated, New York, N.Y., a corporation of New York Filed Dec. 27, 1960, Ser. No. 78,363
5 Claims. (Cl. 179—1)

This invention relates to communication systems for transmitting the information content of a wide-band speech wave over a narrow-band channel, and in particular to the analysis of a speech wave to derive information concerning its pitch characteristic for use in such systems.

Vocoder communication systems of the type described by H. W. Dudley in Patent 2,151,091, granted March 21, 1939, transmit the information content of a wide-band speech wave over a narrow-band channel by analyzing an incoming speech wave to determine its significant characteristics, and by transmitting information regarding these characteristics, instead of the speech wave itself, to a distant receiver station. One of the most important of the speech characteristics analyzed in such systems is the so-called pitch characteristic. A typical speech wave is made up of periodic portions representative of voiced sounds and aperiodic portions representative of unvoiced sounds. Complete specification of the pitch characteristic in a vocoder system requires information signifying whether the incoming speech wave at a particular instant represents a voiced or an unvoiced sound, and if the sound represented is voiced, information regarding either its fundamental frequency or the reciprocal, its fundamental period.

It is a specific object of this invention to determine the pitch characteristic of an incoming speech wave by analyzing it to obtain information specifying whether the speech wave represents a voiced or an unvoiced sound at a given instant, and to obtain information specifying the fundamental period of voiced portions of the speech wave.

It has been determined that the naturalness of human speech is highly dependent upon small irregularities in the fundamental period of voiced sounds. Accordingly, the reproduction of natural sounding speech at a vocoder receiver station from transmitted information concerning speech characteristics requires pitch information that is sufficiently accurate to indicate small irregularities in the fundamental period of voiced sounds.

It is a specific object of this invention to improve the naturalness of vocoder speech by analyzing a speech wave to obtain accurate pitch information that indicates the presence of small irregularities in the fundamental period of voiced portions of a speech wave.

In the present invention, an asymmetrical wave is derived from selected low-frequency components of an incoming speech wave. This asymmetrical wave is periodic during voiced portions of the speech wave and aperiodic during unvoiced portions, and its asymmetry is of the same polarity as the asymmetry of the speech wave. During voiced portions of the speech wave, the period of the corresponding asymmetrical wave, as measured by the intervals between its largest peaks, is exactly equal to the fundamental period of the speech wave. The largest peaks occur in the larger half of the asymmetrical wave, and in order to assure accurate determination of the pitch characteristic from the largest peaks in the asymmetrical wave, the polarity of the larger half of the asymmetrical wave is made uniform; for example, the polarity of the larger half of the asymmetrical wave is made uniformly negative by adjusting the polarity of the speech wave before deriving the asymmetrical wave. For convenience of description, it will be assumed throughout the remainder of this specification that the polarity of the larger half of the asymmetrical wave is uniformly negative. A uniform sampling pulse is generated for each negative-going peak of the asymmetrical wave, and the negative-going peaks of the asymmetrical wave are sampled in response to the sampling pulses to produce a train of samples in which the magnitudes and polarities of the samples correspond to the amplitudes and polarities of the sampled peaks. From the largest negative samples in the train of samples, corresponding to the largest peaks in the asymmetrical wave, there is derived a unidirectional saw-tooth wave whose period, as measured by the intervals between its crests, is identical with the fundamental period of the speech wave. The saw-tooth wave is used to generate two signals containing information regarding the pitch characteristic of the speech wave: a first signal indicative of the voiced or unvoiced nature of the speech wave, and a second signal indicative of the fundamental period of voiced portions of the speech wave. The first, or voiced-unvoiced, signal has two constant-amplitude levels and is obtained by comparing a selected average value of the saw-tooth wave with a selected average value of the speech wave: the first of the two constant-amplitude levels is developed during voiced portions of the speech wave, when speech energy tends to be concentrated in the low-frequency components of the speech wave and the selected average value of the saw-tooth wave exceeds the selected average value of the speech wave; the second of the two levels is developed during unvoiced portions of the speech wave, when speech energy tends to be concentrated in the high-frequency components of the speech wave and the selected average value of the saw-tooth wave is less than the selected average value of the speech wave. The amplitude level of the voiced-unvoiced signal at a given instant thus indicates whether at that instant the speech wave represents a voiced or an unvoiced sound.

The second, or pitch period, signal is obtained by generating a uniform pulse for each crest of the saw-tooth wave, where the interval between successive uniform pulses is exactly equal to the fundamental period of the speech wave. To prevent erroneous indications of the fundamental period during unvoiced, aperiodic portions of the speech wave, the voiced-unvoiced signal is employed to gate the pitch period pulses, thereby blocking spurious pulses generated during unvoiced portions of the speech wave.

The information contained in the voiced-unvoiced and pitch period signals completely and accurately specifiies the pitch characteristic of a speech wave, and utilization of the two signals produced by the present invention in a vocoder communication system improves the naturalness of vocoder speech.

The invention will be fully understood from the following detailed description of illustrative embodiments thereof taken in connection with the appended drawings, in which.

Figure 4:
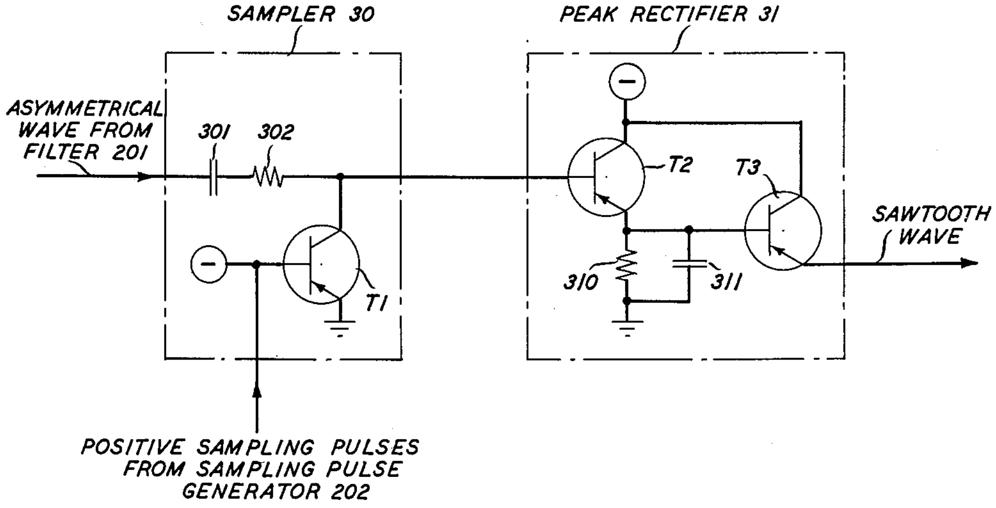
Figure 2:
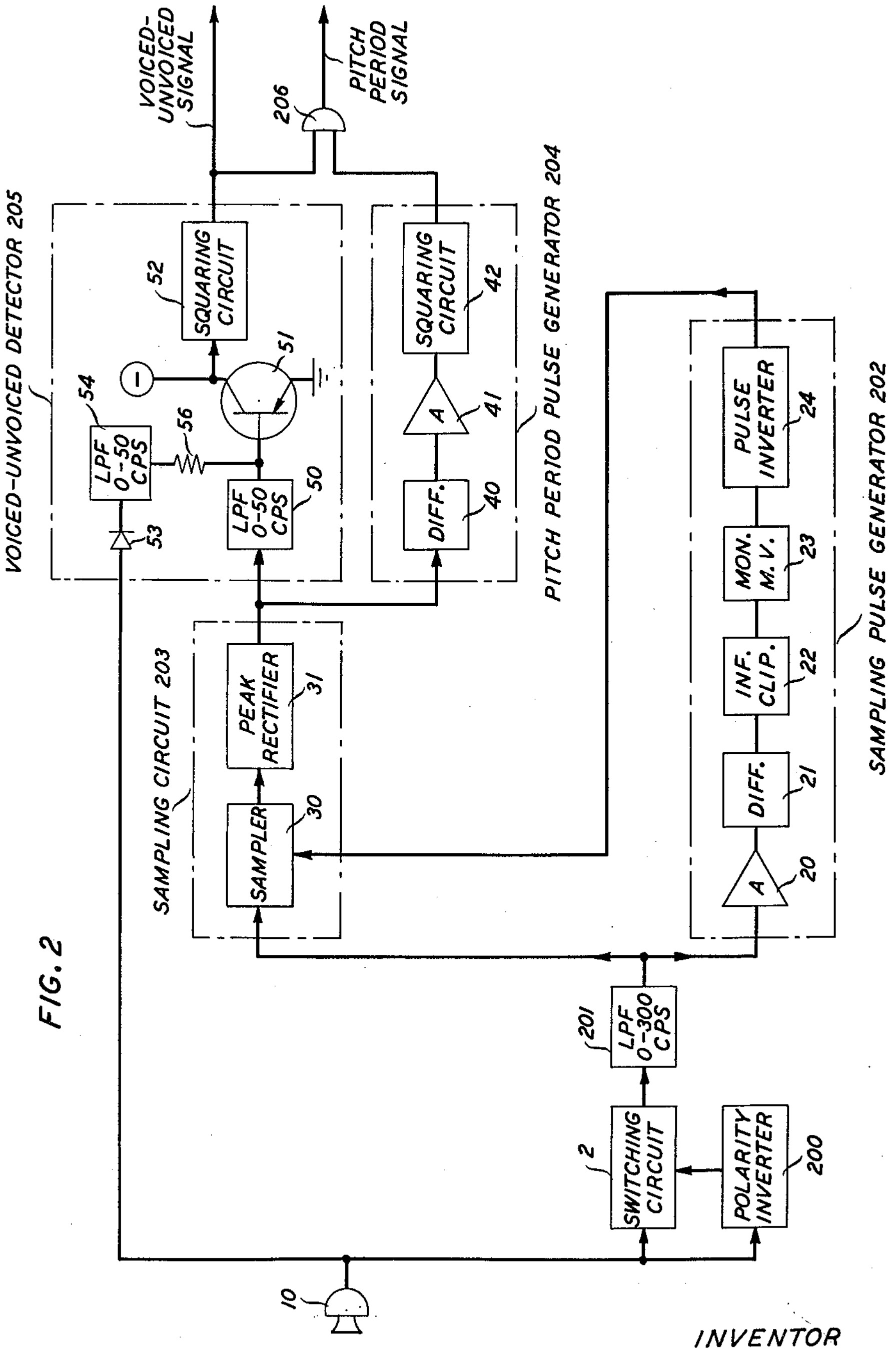
FIG. 2 is a schematic diagram showing apparatus for deriving pitch information from a speech wave.

FIGS. 3A, 3B, 3C, 3D, 3E, 3F, 3G, 3H, and 3J are waveform diagrams of assistance in explaining the operation of the apparatus of FIG. 2; and FIG. 4 is a schematic diagram of sampling circuit 203 shown in the apparatus of FIG. 2.

*Vocoder transmitter station*

Figure 1:
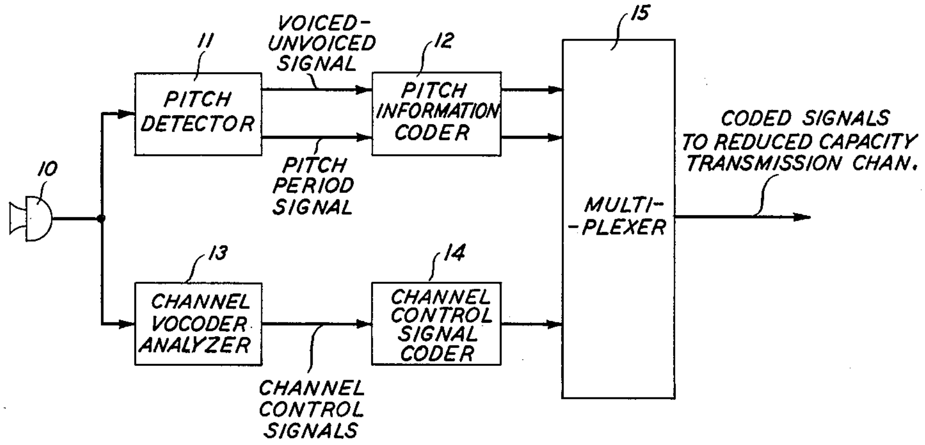
FIG. 1 is a schematic block diagram showing the transmitter station of a vocoder communication system embodying the apparatus of this invention.

With reference to FIG. 1, the apparatus of this invention is shown incorporated in the transmitter station of a conventional vocoder communication system, for example, a channel vocoder system of the type described in the aforementioned Dudley patent. An incoming speech wave from high fidelity microphone 10 is applied in parallel to novel pitch detector 11 of this invention, and to channel vocoder analyzer 13, which is described in detail in the Dudley patent. Pitch detector 11, whose structure and operation are explained below in connection with the description of FIGS. 2 and 4, analyzes the speech wave from microphone 10 to derive information concerning its pitch characteristic, and embodies this information in two signals: a voiced-unvoiced signal, and a pitch period signal. These two signals are coded for transmission by pitch information coder 12; for example, coder 12 may encode the two signals in any one of a number of well-known pulse codes. Similarly, channel vocoder analyzer 13 derives information regarding other significant speech characteristics from the speech wave and embodies this information in a number of channel control signals. The channel control signals are encoded for transmission by channel control signal coder 14, and the coded channel control signals are multiplexed together with the coded pitch information signals by multiplexer 15, of any desired sort, and transmitted over a reduced capacity transmission channel to a receiver station. At the receiver station, natural sounding speech is synthesized from the information conveyed by the transmitted signals.

*Pitch detector*

Referring now to FIG. 2, an incoming speech wave from source 10, for example, a conventional high-quality microphone, is applied to low-pass filter 201 either directly or through polarity inverter 200, of any well-known construction, as determined by switching circuit 2, which may be of any suitable variety. Low-pass filter 201, which has a cut-off frequency of approximately 300 cycles per second, derives from the low-frequency components of the speech wave an asymmetrical wave. A voiced, periodic portion of a typical speech wave is shown in FIG. 3A, and the corresponding asymmetrical wave derived by filter 201 is shown in FIG. 3B. A comparison of FIGS. 3A and 3B reveals that the period of the asymmetrical wave, as measured by the intervals between its largest peaks, is exactly equal to the fundamental period of the speech wave, thus preserving in the period of the asymmetrical wave the small irregularities that characterize the fundamental period of the speech wave. It is further noted that the asymmetry of the asymmetrical wave in FIG. 3B is of the same polarity as the asymmetry of the speech wave, that is, the larger half of the asymmetrical wave has the same polarity as the larger half of the speech wave. In this invention, information regarding the fundamental period of the speech wave is obtained from the largest peaks of the asymmetrical wave, and since the largest peaks occur in the larger half of the asymmetrical wave, the polarity of the larger half of the asymmetrical wave is made uniform in order to assure the accuracy of this information. The polarity of the larger half of the asymmetrical wave developed at the output terminal of filter 201 is made uniform by causing switching circuit 2 to connect either the speech wave from source 10 or the inverted polarity speech wave from inverter 200 to the input terminal of filter 201, depending upon which half of the speech wave is larger. In the apparatus of this invention, the polarity of the larger half of the asymmetrical wave is made uniformly negative, but it is to be understood that with appropriate modification of the apparatus, the polarity may be made uniformly positive with equally satisfactory results.

The asymmetrical output wave of filter 201 is applied in parallel to sampling pulse generator 202 and to sampling circuit 203. Generator 202 comprises a linear amplifier 20, differentiator 21, infinite clipper 22, monostable multivibrator 23, and pulse inverter 24 connected in series, all of which are of well-known construction. Differentiator 21 develops at its output terminal a wave proportional to the derivative of the asymmetrical wave, as shown in FIG. 3C, in which each zero-crossing of the derivative wave in FIG. 3C corresponds to a peak in the asymmetrical wave in FIG. 3B. Infinite clipper 22 clips the peaks of the differentiated wave to produce a rectangular wave of uniform amplitude, as shown in FIG. 3D, whose axis crossings coincide with the axis crossings of the derivative wave. The rectangular output wave of infinite clipper 22 is applied to monostable multivibrator 23, and each positive-going step of the rectangular wave, which corresponds to a negative-going peak of the asymmetrical wave, triggers multivibrator 23 to its unstable state. The duration of the unstable state of multivibrator 23 is selected to be on the order of 100 microseconds, in order to develop at its output terminal uniform 100 microsecond pulses of negative polarity in response to positive-going steps of the rectangular wave, as shown in FIG. 3E. Sampling circuit 203 operates under the control of sampling pulses from generator 202 to sample the negative-going peaks of the asymmetrical wave, and the sampling operation requires that the polarity of the sampling pulses be opposite to that of the negative-going peaks. The negative polarity output pulses of multivibrator 23, which coincide with the negative-going peaks of the asymmetrical wave as revealed by a comparison of FIGS. 3B and 3E, are made positive by a suitable pulse inverter 24, and the uniform positive polarity output pulses of inverter 24, illustrated in FIG. 3F, are utilized as sampling pulses to control the operation of sampling circuit 203.

In sampling circuit 203, a specific embodiment of which is shown in FIG. 4, the sampling pulses from generator 202 and the asymmetrical wave from filter 201 are applied to sampler 30. Sampler 30 has two operating states, conducting and nonconducting, and in the absence of a sampling pulse, sampler 30 is normally maintained in its nonconducting state. The application of a positive sampling pulse from generator 202, however, changes sampler 30 to its conducting state for the duration of the sampling pulse, and during the time that sampler 30 is conducting the asymmetrical wave from filter 201 is passed to peak rectifier 31. Since the positive sampling pulses coincide with negative-going peaks of the asymmetrical wave, the samples passed by sampler 30 to peak rectifier 31 are small portions of the negative-going peaks of the asymmetrical wave. The train of samples of the asymmetrical wave passed by sampler 30 are illustrated in FIG. 3G, in which it is observed that the magnitudes and polarities of the samples correspond to the amplitudes and polarities of the negative-going peaks of the asymmetrical wave in FIG. 3B.

Peak rectifier 31 operates to generate a unidirectional saw-tooth wave of negative polarity, illustrated in FIG. 3H, from the largest of the negative samples passed by sampler 30, where the negative-going crests of the saw-tooth wave coincide with the largest negative samples. Since the largest negative samples are derived from the largest peaks of the asymmetrical wave, the period of the saw-tooth wave, as measured by the intervals between crests, is identical with the fundamental period of the speech wave.

The saw-tooth output wave of circuit 203 is used to produce two information-bearing signals that completely specify the pitch characteristic of the original speech wave: voiced-unvoiced detector 205 utilizes the saw-tooth wave to produce a first signal that indicates whether the speech wave represents a voiced or an unvoiced sound at a particular instant; pitch period pulse generator 204 utilizes the saw-tooth wave to produce a second signal indicative of the fundamental period of voiced portions of the speech wave.

In voiced-unvoiced detector 205, the saw-tooth output wave of circuit 203 is averaged over several pitch periods by low-pass filter 50, whose cut-off frequency is approximately 50 cycles per second. Since the saw-tooth wave, as shown in FIG. 3H, has a negative polarity, the average of the saw-tooth wave is also negative, and therefore the output signal of filter 50 is of negative polarity. This negative polarity signal is applied to the base of transistor 51, which has a grounded emitter terminal and a collector terminal maintained at a negative bias. The original speech wave from source 10 is also applied to voiced-unvoiced detector 205, where a signal proportional to the average of the absolute value of the speech wave over several periods is obtained by passing the speech wave through rectifier 53 and low-pass filter 54, whose cut-off frequency is about 50 cycles per second. Since the absolute value of the speech wave is positive, the signal developed at the output terminal of filter 54 is of positive polarity, and this positive polarity signal, after passage through resistor 56, is also applied to the base of transistor 51. It is well known that during voiced portions of speech, energy tends to be concentrated in the low-frequency speech components, while during unvoiced portions of speech, energy tends to be concentrated in the high-frequency speech components. The resistance, *r*, of resistor 56 is selected on the basis of these phenomena to produce the following relationships between the sum of the average saw-tooth wave, denoted $V_1$, and the average absolute speech wave, denoted $V_2$, applied to the base of transistor 51:

During voiced portions of the speech wave, $$V_1+rV_2<0 \qquad (1)$$

and during unvoiced portions of the speech wave, $$V_1+rV_2>0 \qquad (2)$$

Thus during voiced portions of the speech wave, when the base of transistor 51 is made negative, transistor 51 conducts and the output signal appearing at its collector terminal has a first constant amplitude; conversely, during unvoiced portions of the speech, when the base of transistor 51 is made positive, transistor 51 does not conduct and the output signal appearing at its collector terminal has a second constant amplitude. Transistor 51 thus acts as a polarity sensitive switching device to compare the average of the saw-tooth wave with the average of the absolute value of the speech wave, thereby producing a voiced-unvoiced signal characterized by two discrete, constant-amplitude levels, one signifying voiced portions of the speech wave and the other signifying unvoiced portions of the speech wave. The collector terminal of transistor 51 is connected to the input terminal of squaring circuit 52, for example, a Schmidt trigger circuit, which squares or sharpens the transition of the voiced-unvoiced signal from one amplitude level to another, thereby producing at the outpu terminal of detector 205 a voiced-unvoiced signal with a rectangular waveform.

The saw-tooth output wave of circuit 203 is also applied to pulse generator 204, which comprises differentiator 40, amplifier 41, and squaring circuit 42 connected in series. All of the elements of generator 204 are of well-known construction and they serve to produce at the output terminal of generator 204 a uniform amplitude pulse for each crest of the applied saw-tooth wave, as shown in a comparison of FIGS. 3H and 3J. The period of the output pulses of generator 204, as measured by the intervals between pulses, is thus exactly equal to the fundamental period of the speech wave, and the output pulses of generator 204 therefore constitute a highly accurate source of information concerning the fundamental period of the speech wave. Utilization of these pulses as a source of information regarding the fundamental period of a speech wave in a vocoder system, as shown in FIG. 1, produces natural sounding speech at the vocoder receiver station.

To prevent erroneous indications of the fundamental period due to spurious pulses generated during unvoiced, aperiodic portions of the speech wave, the output pulses of generator 204 are passed through AND gate 206 before being utilized in a vocoder system of the type shown in FIG. 1. Gate 206 is controlled by the voiced-unvoiced output signal of detector 205, and is enabled only during voiced portions of speech, thereby blocking the passage of spurious pulses from generator 204 during unvoiced portions of speech.

*Sampling circuit*

Referring now to FIG. 4, there is shown a preferred embodiment of sampling circuit 203 of FIG. 2. Positive sampling pulses from sampling pulse generator 202 are passed to sampler 30 of circuit 203, where they are applied to the base of transistor T1, which has a grounded emitter terminal, and a base normally maintained at a suitable negative bias. The asymmetrical wave derived from the low-frequency components of the speech wave by filter 201 is also passed to sampler 30, where the direct-current component of the wave is removed by capacitor 301, and the remaining alternating-current components of the asymmetrical wave are applied to the collector terminal of transistor T1 through impedance element 302. In the absence of a positive sampling pulse from generator 202, transistor T1 is maintained in a saturated state by the negative bias on its base to block the passage of the asymmetrical wave. The application of a positive sampling pulse to the base of transistor T1, however, overcomes the negative bias and permits passage of samples of the asymmetrical wave for the duration of the sampling pulse. Since the sampling pulses coincide with negative-going peaks in the asymmetrical wave, the samples permitted to be passed by transistor T1 are samples of the negative-going peaks of the asymmetrical wave. As illustrated in FIGS. 3B and 3G, the magnitudes of the samples are proportional to the amplitudes of the corresponding negative-going peaks of the asymmetrical wave, and the polarities of the samples are the same as the polarities of the corresponding negative-going peaks.

The samples of the symmetrical wave passed by sampler 30 are applied to the base of transistor T2 of peak rectifier 31, where the collector terminal of transistor T2 is maintained at an appropriate negative bias. To the emitter terminal of transistor T2 there is connected an RC network composed of resistor 310 and capacitor 311, followed by transistor T3, which acts as an emitter follower both to present a high impedance to the RC network and to provide a low impedance coupling for the output signal of peak rectifier 31. Positive samples reverse bias the base-emitter junction of transistor T2, thereby preventing the charging of capacitor 311. Negative samples, however, forward bias the base-emitter junction of transistor T2 when the magnitude of the negative sample exceeds the negative charge on capacitor 311. The voltages developed across capacitor 311 by negative samples decay in accordance with the following well-known relation $$V_t=V_0e^{\frac{-t}{RC}} \qquad (3)$$

where $V_t$ is the voltage across capacitor 311 at a time $t$ after the occurrence of a negative sample of magnitude $V_0$, and the amount of voltage decay after a time $t$ is determined by the so-called time constant, or product, RC, of the resistance R of resistor 310 and the capacitance C of capacitor 311. As illustrated in FIG. 3H, the decay of the voltages developed across capacitor 311 by negative samples produces a saw-tooth wave at the output terminal of peak rectifier 31. In order for the period of the saw-tooth wave, as measured by the intervals between its crests, to be identical with the period of the speech wave, only the largest negative samples, which coincide with the largest peaks in the asymmetrical wave, are allowed to produce crests in the saw-tooth wave, and smaller negative samples, for example, $V_s$ in FIG. 3G, are prevented from producing crests in the saw-tooth wave. This is achieved by selecting a suitable time constant that will cause the voltage across capacitor 311 to decay relatively slowly; for example, a time constant on the order of 14 milliseconds causes the voltage across capacitor 311 to decay to about 70 percent of its initial value after a time $t=5$ milliseconds, and to about 50 percent of its initial value after a time $t=10$ milliseconds. Since the fundamental period of typical voiced sounds, and therefore the intervals between the largest negative samples, varies from approximately 3 to 10 milliseconds, a time constant on the order of 14 milliseconds insures that the period of the saw-tooth wave is identical with the period of the speech wave, except in the comparatively rare instance when the magnitude of a smaller negative sample exceeds the voltage remaining on capacitor 311.

It is to be understood that the above-described arrangements are illustrative of the applications of the principles of this invention. Numerous other arrangements may be designed by those skilled in the art without departing from the spirit and scope of the invention.

What is claimed is:

1. In a vocoder communication system, means for obtaining information-bearing signals that specify the pitch characteristic of a speech wave which comprises a source of a speech wave, means for deriving from selected components of said speech wave an asymmetrical wave, means for sampling selected peaks of said asymmetrical wave, means for developing a unidirectional wave from the largest of said sampled peaks, means for comparing the average value of said unidirectional wave with the average absolute value of said speech wave to produce a first signal indicative of the voiced-unvoiced nature of said speech wave, and means for generating from said unidirectional wave a second signal indicative of the fundamental period of said speech wave.

2. In a vocoder communication system, means for obtaining information-bearing signals that specify the pitch characteristic of a speech wave which comprises a source of a speech wave, means for deriving an asymmetrical wave from selected components of said speech wave, means for generating sampling pulses for selected peaks of said asymmetrical wave, means under the control of said sampling pulses for obtaining samples of said selected peaks, means for developing a unidirectional wave from the largest of said selected peak samples, means for comparing the average value of said unidirectional wave with the average absolute value of said speech wave to produce a first signal indicative of the voiced-unvoiced nature of said speech wave, and means for deriving from said unidirectional wave a second signal indicative of the fundamental period of voiced portions of said speech wave.

3. In a system for analyzing a speech wave to produce signals specifying the pitch characteristic of said speech wave, the combination that comprises a source of a speech wave, means for deriving from selected components of said speech wave an asymmetrical wave whose larger portion has a uniform predetermined polarity, means for generating a sampling pulse for each peak of said asymmetrical wave whose direction is the same as said predetermined polarity, means responsive to said sampling pulses for obtaining from said asymmetrical wave a sample of each peak whose direction is the same as said predetermined polarity, wherein the magnitude and polarity of each sample correspond to the amplitude and polarity of one of said peaks, means for developing a unidirectional wave from the largest of said peak samples, means for comparing the average value of said unidirectional wave with the average absolute value of said speech wave to produce a first signal indicative of the voiced-unvoiced nature of said speech wave, means for deriving from said unidirectional wave a second signal indicative of the fundamental period of said speech wave, and means under the control of said first signal for gating said second signal to eliminate spurious indications of the fundamental period during unvoiced portions of said speech wave.

4. In a system for analyzing a speech wave to produce signals indicative of the speech wave pitch characteristic, the combination that comprises a source of a speech wave, means for deriving from selected low-frequency components of said speech wave an asymmetrical wave whose larger portion is of negative polarity, means supplied with said asymmetrical wave for generating a positive sampling pulse for each negative-going peak of said asymmetrical wave, means under the control of said positive sampling pulses for sampling each negative-going peak of said asymmetrical wave, means for applying said asymmetrical wave to said sampling means, means connected to said sampling means for developing a negative polarity wave from the largest of said sampled negative-going peaks, means supplied with said negative polarity wave and said speech wave for deriving a signal whose amplitude level is indicative of the voiced-unvoiced nature of said speech wave, including means for averaging said negative polarity wave, means for obtaining the absolute value of said speech wave, means for averaging the absolute value of said speech wave, and polarity sensitive means for combining the average of said negative polarity wave with the average of the absolute value of said speech wave to produce an output signal with two discrete amplitude levels, wherein one of said amplitude levels occurs when the combination of the average of said negative polarity wave and the average of the absolute value of said speech wave is negative and the other of said amplitude levels occurs when the combination of the average of said negative polarity wave and the average of the absolute value of said speech wave is positive, means supplied with said negative polarity wave for generating train of uniform pulses indicative of the fundamental period of said speech wave, including a differentiator, an amplifier and a squaring circuit connected in series, and means responsive to said voiced-unvoiced signal for gating said train of pulses to eliminate pulses generated during unvoiced portions of said speech wave.

5. Apparatus as defined in claim 4 wherein said means for generating a sampling pulse comprises an amplifier, a differentiator, an infinite clipper, a monostable multivibrator, and a pulse inverter connected in series.

No references cited.